(12) United States Patent
Kondou

(10) Patent No.: US 9,908,387 B2
(45) Date of Patent: Mar. 6, 2018

(54) AIR CONDITIONING DEVICE FOR VEHICLE

(71) Applicant: DENSO CORPORATION, Kariya, Aichi-pref. (JP)

(72) Inventor: Toshiaki Kondou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 191 days.

(21) Appl. No.: 14/773,058

(22) PCT Filed: Feb. 21, 2014

(86) PCT No.: PCT/JP2014/000902
§ 371 (c)(1),
(2) Date: Sep. 4, 2015

(87) PCT Pub. No.: WO2014/136394
PCT Pub. Date: Sep. 12, 2014

(65) Prior Publication Data
US 2016/0009160 A1 Jan. 14, 2016

(30) Foreign Application Priority Data
Mar. 5, 2013 (JP) .................................. 2013-043270

(51) Int. Cl.
*B60H 1/00* (2006.01)

(52) U.S. Cl.
CPC ..... *B60H 1/00885* (2013.01); *B60H 1/00021* (2013.01); *B60H 1/00521* (2013.01);
(Continued)

(58) Field of Classification Search
CPC ............ B60H 1/00885; B60H 1/00021; B60H 1/00521; B60H 1/00564;
(Continued)

(56) References Cited

U.S. PATENT DOCUMENTS 4,453,591 A * 6/1984 Fehr ................... B60H 1/00064
165/202
4,991,646 A * 2/1991 Spears ............... B60H 1/00471
165/122

(Continued)

FOREIGN PATENT DOCUMENTS

EP 1857308 A1 11/2007
JP H10230733 A 9/1998

(Continued)

OTHER PUBLICATIONS

International Search Report and Written Opinion (in Japanese with English Translation) for PCT/JP2014/000902, dated Apr. 8, 2014; ISA/JP.

*Primary Examiner* — Justin Jonaitis
(74) *Attorney, Agent, or Firm* — Harness, Dickey & Pierce, P.L.C.

(57) ABSTRACT

A vehicle air conditioning device has an air-conditioning unit including a temperature regulation unit having an evaporator and a blower unit including a blower. The blower unit is offset to a side of the temperature regulation unit. A deflection guide to deflect a flow of air is provided upstream of the evaporator in a flow of air flowing into an inflow plane of the evaporator from the blower. The deflection guide has a plate-like defection portion inclined with respect to the inflow plane, and a support portion supporting the deflection portion by extending from the blower unit. A gap is provided between the support portion and the evaporator. Air that has collided with the deflection portion is changed in flow direction to head for the blower side of the inflow plane.

18 Claims, 15 Drawing Sheets

(52) U.S. Cl.
CPC ............... *B60H 1/00564* (2013.01); *B60H 2001/00092* (2013.01); *B60H 2001/00721* (2013.01)

(58) Field of Classification Search
CPC .......... B60H 2001/00092; B60H 2001/00721; B60H 2001/0015; B60H 2001/00185; B60H 1/00842
USPC ....................................... 165/202, 203, 204
See application file for complete search history.

(56) References Cited

U.S. PATENT DOCUMENTS

| | | | | |
|---|---|---|---|---|
| 5,934,989 | A * | 8/1999 | Yamamoto | B60H 1/00028 454/156 |
| 6,179,044 | B1 * | 1/2001 | Tabara | B60H 1/00021 165/42 |
| 6,431,257 | B1 * | 8/2002 | Sano | B60H 1/00064 165/202 |
| 6,520,850 | B1 * | 2/2003 | Buckman | B60H 1/00678 137/338 |
| 2012/0168117 | A1 * | 7/2012 | Jairazbhoy | B60H 1/00028 165/48.1 |

FOREIGN PATENT DOCUMENTS

| | | |
|---|---|---|
| JP | 2000094931 A | 4/2000 |
| JP | 2002144848 A | 5/2002 |
| JP | 2003267046 A | 9/2003 |
| JP | 2005319874 A | 11/2005 |
| JP | 2006038431 A | 2/2006 |
| JP | 2007333312 A | 12/2007 |
| JP | 2009166714 A | 7/2009 |

* cited by examiner

COMPARATIVE EXAMPLE

COMPARATIVE EXAMPLE

COMPARATIVE EXAMPLE

COMPARATIVE EXAMPLE

COMPARATIVE EXAMPLE

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2014/000902 filed on Feb. 21, 2014 and published in Japanese as WO 2014/136394 A1 on Sep. 12, 2014. This application is based on and claims the benefit of priority from Japanese Patent Application No. 2013-043270 filed on Mar. 5, 2013. The entire disclosures of all of the above applications are incorporated herein by reference.

TECHNICAL FIELD

The present disclosure relates to an air conditioning device for a vehicle, in which a blower unit is offset to a side of a temperature regulation unit, and more particularly, to an air conditioning device for a vehicle, which is capable of homogenizing an air velocity distribution within an air-conditioning unit.

BACKGROUND ART

An air conditioning device for a vehicle, designed with a vehicle mounting layout, according to which a blower unit is offset upstream of an inclined evaporator in a flow of air, is known. In the vehicle air conditioning device designed with such a mounting layout (referred to as the present mounting layout), a wind direction vector of a main flow of air discharged from a blower scroll is parallel to an inflow plane of the evaporator and the flow of air separates from the evaporator (vortices are developed).

According to the mounting layout as above, separation of the flow of air deteriorates an air velocity distribution of air flowing into the evaporator. More specifically, an inflow air velocity of the evaporator across the inflow plane is low on the blower side and high on the opposite side to the blower. Such an inhomogeneous air velocity distribution causes a sense of air velocity and a temperature from an air-conditioning unit to differ noticeably between the right and left in a vehicle interior and an occupant feels less comfortable.

The vehicle air conditioning device disclosed, for example, in Patent Document 1 is proposed as means for improving the inflow air velocity distribution of the evaporator. In the disclosed vehicle air conditioning device, an air blower unit and an air-conditioning unit are offset in a width direction of a vehicle. In order to adjust an air velocity distribution of air flowing into a heat exchanger without changing a wall surface shape of an air-conditioning case, the vehicle air conditioning device adopts a configuration as follows.

The vehicle air conditioning device includes a blower unit and a temperature regulation unit that adjusts a temperature of sent air using an evaporator and blows temperature-adjusted air into a vehicle interior. The sent air flows into the evaporator by passing a path bent at a right angle. In a counter wall surface of the bent path facing to an air inflow surface (inflow plane) of the evaporator, multiple protrusions protruding in a direction perpendicular to the air inflow surface are provided along a direction of the flow of air immediately before flowing into the bent path. The multiple protrusions form steps in the blower unit in such a manner that a space for air entering the evaporator is reduced more in the inner portion.

PRIOR ART DOCUMENT

Patent Document

Patent Document 1: JP 2009-166714 A

SUMMARY OF THE INVENTION

It can be said that the technique of Patent Document 1 adopts a method of easing concentration of air in the inner portion and introducing air to the front side opposite to the inner side by letting air entering the inflow plane of the evaporator collide with the steps formed so as to reduce a space more in the inner portion. The inventor of the present disclosure, however, reviewed the technique and discovered that the method of improving an air velocity distribution as above has possibilities of increasing fluid resistance markedly and also making the structure complex.

In view of the foregoing, it is an objective of the present disclosure to provide a vehicle air conditioning device with a duct structure to flow air between a blower and an evaporator, which duct structure has low fluid resistance and is relatively easy to manufacture because no complex structure is involved.

The subject matter of the patent literature cited herein as the related art is hereby introduced or incorporated herein by reference as a description of technical elements described herein.

According to an aspect of the present disclosure, an air conditioning device for a vehicle includes a blower unit, a temperature regulation unit and a deflection guide. The blower unit has a blower that blows air, and a temperature regulation unit is disposed on a side of the blower unit. The temperature regulation unit has an evaporator provided with an inflow plane extending in a flow direction of the air blown from the blower and configured to exchange heat with air inflowing through the inflow plane. The deflection guide is disposed upstream of the evaporator in a direction of a flow of air flowing into the inflow plane of the evaporator, and deflects a flow of the air from the blower to the inflow plane of the evaporator. The deflection guide includes a deflection portion having a plate shape and inclined with respect to the inflow plane of the evaporator, and a support portion supporting the deflection portion. The deflection portion changes a direction of a flow of the air blown from the blower toward an end part of the inflow plane adjacent to the blower.

According to the configuration above, the deflection guide lets more air flow toward the end part of the inflow plane nearer to the blower. Hence, a distribution of air flowing into the evaporator can be made to be homogeneous, and an uneven temperature distribution of air-conditioning air, which is air that has passed through the evaporator and to be blown into the vehicle interior, can be corrected.

EMBODIMENTS FOR EXPLOITATION OF THE INVENTION

Figure 1:
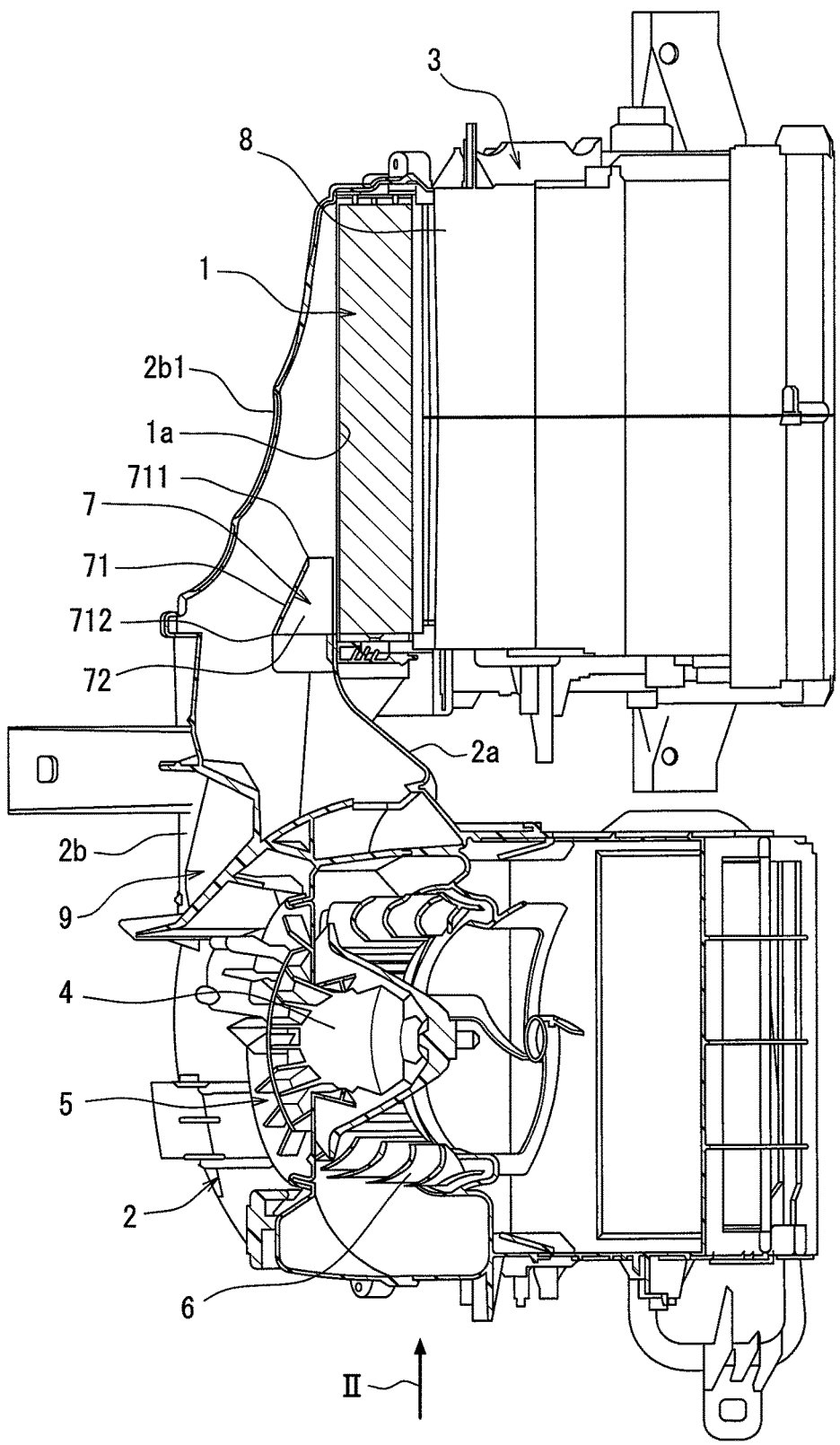
FIG. 1 is a sectional view taken along the line I-I of FIG. 2 and showing an air-conditioning unit according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration.

The parts may be combined even if it is not explicitly described that the parts can be combined. The embodiments may be partially combined even if it is not explicitly described that the embodiments can be combined, provided there is no harm in the combination.

First Embodiment

Hereinafter, an air conditioning device for a vehicle, according to a first embodiment of the present disclosure, will be described in detail using FIG. 1 through FIG. 10. Referring to FIG. 1, a blower unit 2 is offset substantially horizontal to an evaporator 1. More specifically, air-conditioning units 2 and 3 includes a temperature regulation unit 3 having the evaporator 1 and the blower unit 2 having a blower 5, and the blower unit 2 is offset to a side of the temperature regulation unit 3. The temperature regulation unit 3 and the blower unit 2 are disposed side by side in a vehicle width direction.

The evaporator 1 has a box-shaped core that cools air to be blown into a vehicle interior by letting a refrigerant evaporate. The refrigerant is routed from an unillustrated compressor that compresses the refrigerant circulated in the vehicle air conditioning device. To supply air to the evaporator 1, air in the vehicle interior is drawn via an internal air inlet port by the blower 5 in the blower unit 2 or air outside the vehicle is drawn via an external air inlet port. Whether air is drawn via the internal air inlet port or air is drawn via the external air inlet port is controlled by motion of an unillustrated internal air and external air switching door.

The evaporator 1 is fixed by a first blower case 2a or a heater case 8. Air sent from a sirocco fan 6 rotated by a blower motor 4 passes through a blower scroll 9 including the first blower case 2a and a second blower case 2b and flows into the evaporator 1. Air that has passed through the evaporator 1 flows into the temperature regulation unit 3 and is sent into the vehicle interior via an unillustrated vehicle ventilation duct.

The blower 5 blows air to an inflow plane 1a of the evaporator 1 by rotating the sirocco fan 6 using the blower motor 4. In other words, air which is blown by the blower 5 flows into the evaporator 1 via the inflow plane 1a substantially parallel to the vehicle width direction. Because the blower unit 2 is offset to a side of the temperature regulation unit 3, air tends to flow more to a side (upper side of FIG. 1) farther from the blower 5 than to a side (lower side of FIG. 1) nearer to the blower 5 in the inflow plane 1a on the front surface side of the evaporator 1. By taking such a tendency into consideration, a deflection guide 7 to deflect a flow of air is provided upstream of the evaporator 1 in a flow of air from the blower 5 to the inflow plane 1a of the evaporator 1.

The deflection guide 7 has a plate-like deflection portion 71 inclined so as to receive air flowing toward the evaporator 1. The deflection guide 7 also has a support portion 72 that supports the deflection portion 71 by extending from the blower unit 2. The deflection guide 7 changes a direction of the flow of air after the air collides with the deflection portion 71 so as to head for the inflow plane 1a of the evaporator 1. Owing to the deflection guide 7 that changes a direction of the flow of air, air flows more to the end (lower side of FIG. 1) of the inflow plane 1a nearer to the blower unit 2. Consequently, an air velocity distribution is made homogeneous. More specifically, the deflection portion 71 may face to the end part of the inflow plane 1a adjacent to the blower 5 in a direction perpendicular to the inflow plane 1a. Alternatively, the deflection portion 71 may be inclined as follows. That is, it may be configured in such a manner that one end 711 of the deflection portion 71 in the vehicle width direction is situated between the other end 712 of the deflection portion 71 in the vehicle width direction and the inflow plane 1a in a direction perpendicular to the inflow plane 1a while the other end 712 of the deflection portion 71 in the vehicle width direction is situated between the one end 711 of the deflection portion 71 in the vehicle width direction and the blower unit 2 in the vehicle width direction.

The air-conditioning unit 2 or 3 is formed of upper and lower split cases. For example, the blower unit 2 includes a combination of the first blower case 2a and the second blower case 2b. The first blower case 2a is provided on a ceiling side (upper side) of the vehicle. The second blower case 2b is provided on a floor side (lower side) of the vehicle. The deflection guide 7 is molded from resin integrally with at least one of the first blower case 2a and the second blower case 2b.

In other words, the deflection guide 7 is integrally molded with the blower unit 2 from resin continuing to resin forming the blower unit 2. Accordingly, there is no need to provide a separate part in addition to the blower unit 2, and thus an increase of the cost can be restricted. More specifically, the deflection guide 7 is integrally molded with the first blower case 2a situated on the upper side than the second blower case 2b. Hence, the deflection guide 7 can be molded from resin at the same time when the first blower case 2a is molded. Hence, manufacturing using a die becomes easier.

In FIG. 1, a top-bottom direction on the sheet surface is the vehicle width (right-left) direction.

Figure 2:
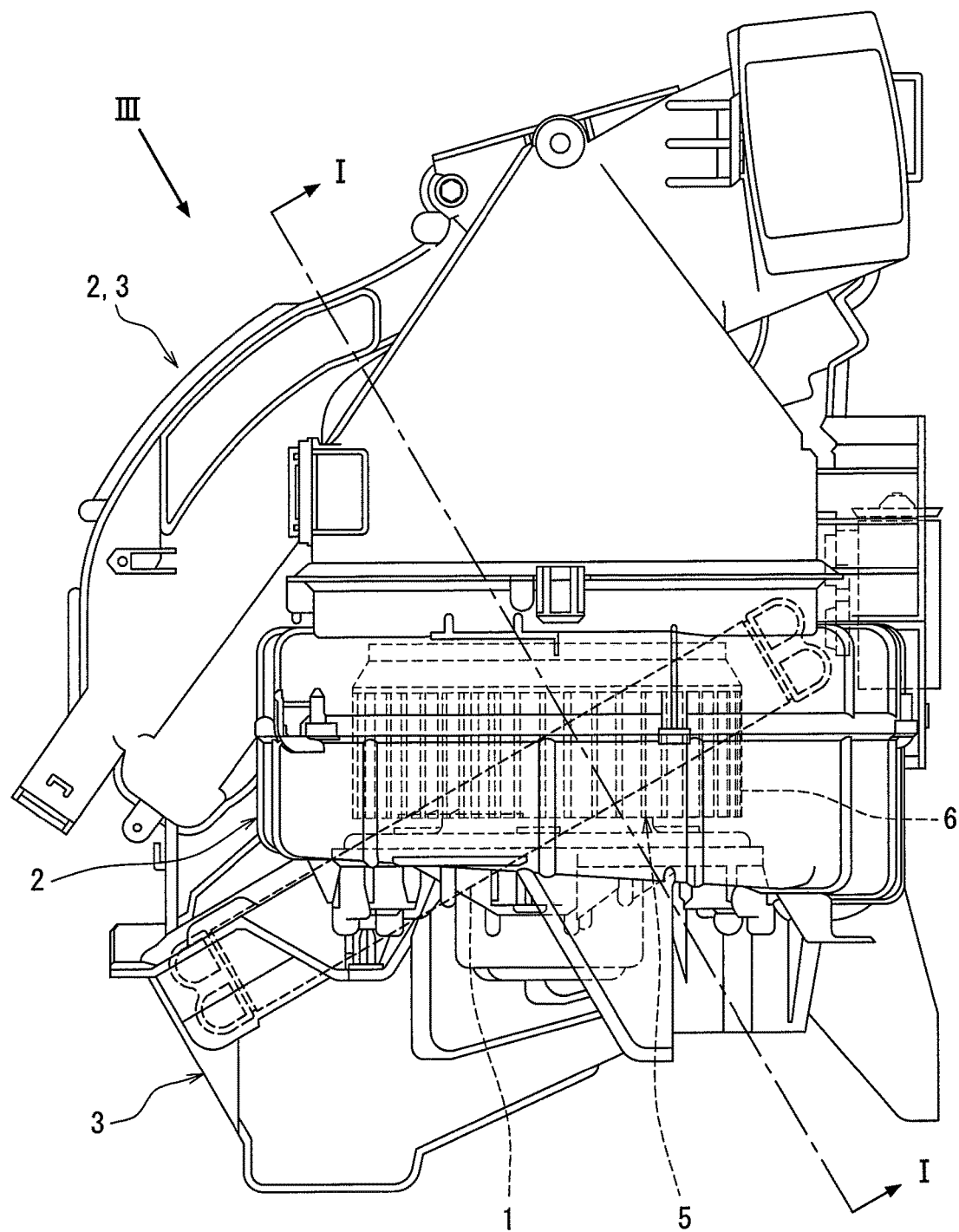
FIG. 2 is a side view of the air-conditioning unit of the first embodiment when viewed in a direction indicated by an arrow II of FIG. 1.

FIG. 2 shows the air-conditioning unit 2 or 3 when viewed in a direction indicated by an arrow II of FIG. 1. Inside the blower unit 2 of the air-conditioning unit 2 or 3, as is indicated by a broken line, the sirocco fan 6 is disposed so as to rotate about a rotation shaft extending in a top-bottom direction of FIG. 2. Also, as is indicated by a broken line, the evaporator 1 is disposed in the temperature regulation unit 3 of the air-conditioning unit 2 or 3. The evaporator 1 is disposed so as to incline with respect to a front-rear direction of the vehicle, that is, a right-left direction of FIG. 2.

Figure 3:
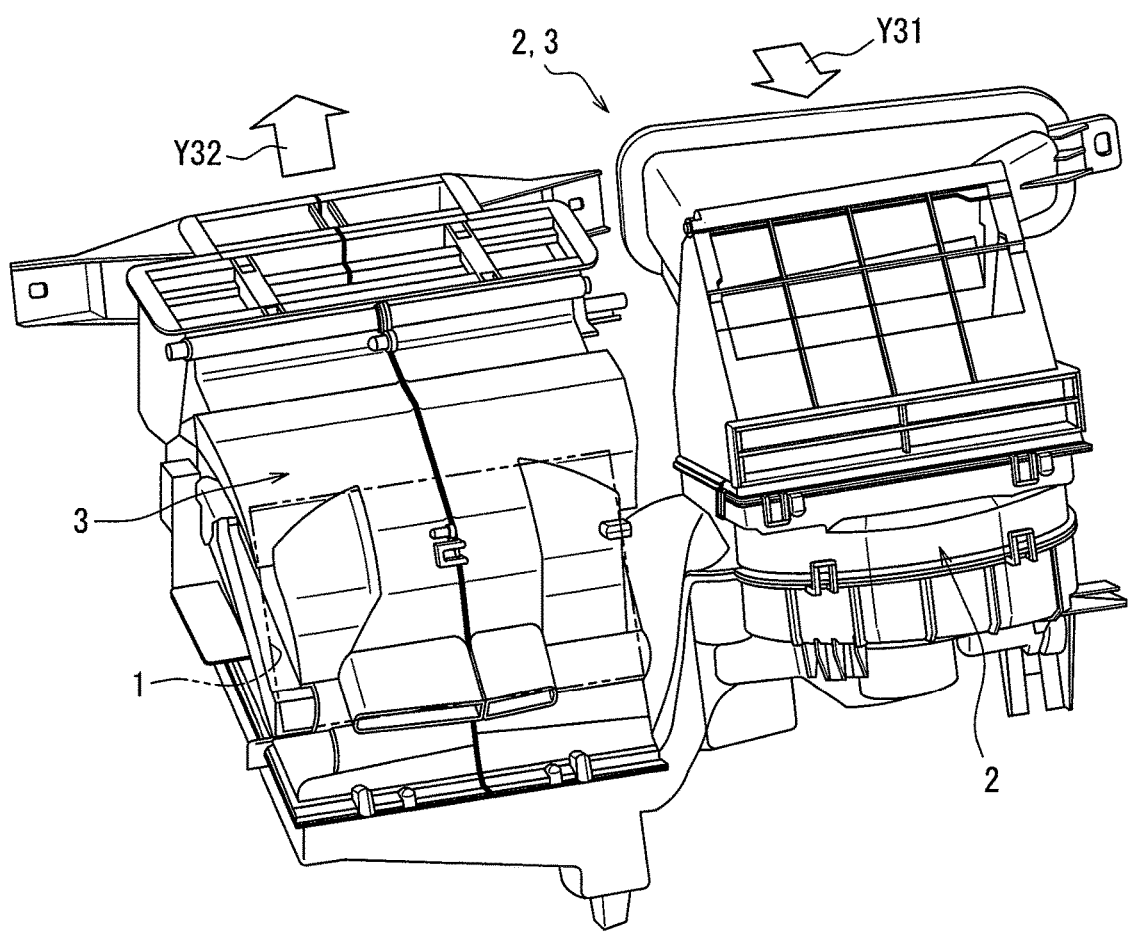
FIG. 3 is a perspective view of the air-conditioning unit of the first embodiment when viewed in a direction indicated by an arrow III of FIG. 2.
Figure 3:
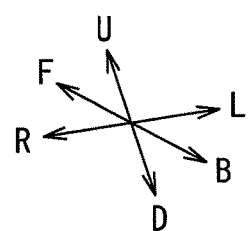

FIG. 3 shows the air-conditioning unit 2 or 3 when viewed in a direction indicated by an arrow III of FIG. 2. Air is drawn into the blower unit 2 of the air-conditioning unit 2 or 3 as indicated by an arrow Y31 with a rotation of the blower 5 (FIG. 2). The flow of air passes through the interior of the air-conditioning unit 2 or 3 in the shape of a capital U and flows through the evaporator 1 provided in the temperature regulation unit 3 as indicated by a broken line to form air-conditioning air indicated by an arrow Y32 that provides air-conditioning to the vehicle interior. Regarding signs indicating three-dimensional directions in FIG. 3, U denotes an upward direction, D denotes a downward direction, R denotes a rightward direction and L denotes a leftward direction when viewed from a driver inside the vehicle, and F denotes a forward direction and B denotes a rearward direction of the vehicle.

Figure 4:
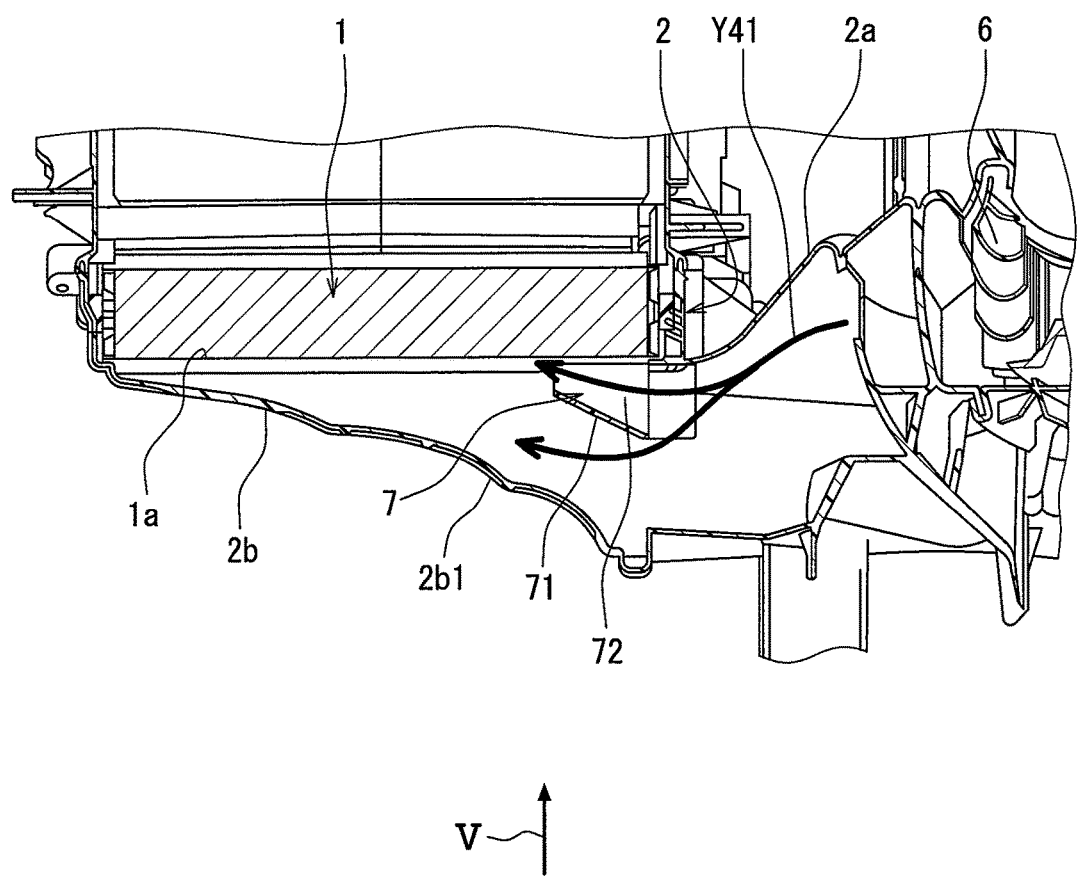
FIG. 4 is a sectional view schematically showing flows of air to an evaporator created by a deflection guide of the first embodiment.

The flow of air to the evaporator 1 created by the deflection guide 7 will be described using FIG. 4. The mainstream or a part of the mainstream of air flowing from the blower unit 2 is forced to deflect by the deflection guide 7 as indicated by an arrow Y41 to even out inflow air velocities to the evaporator 1. Herein, the flow of air is split to two as indicated by the arrow Y41.

Figure 5:
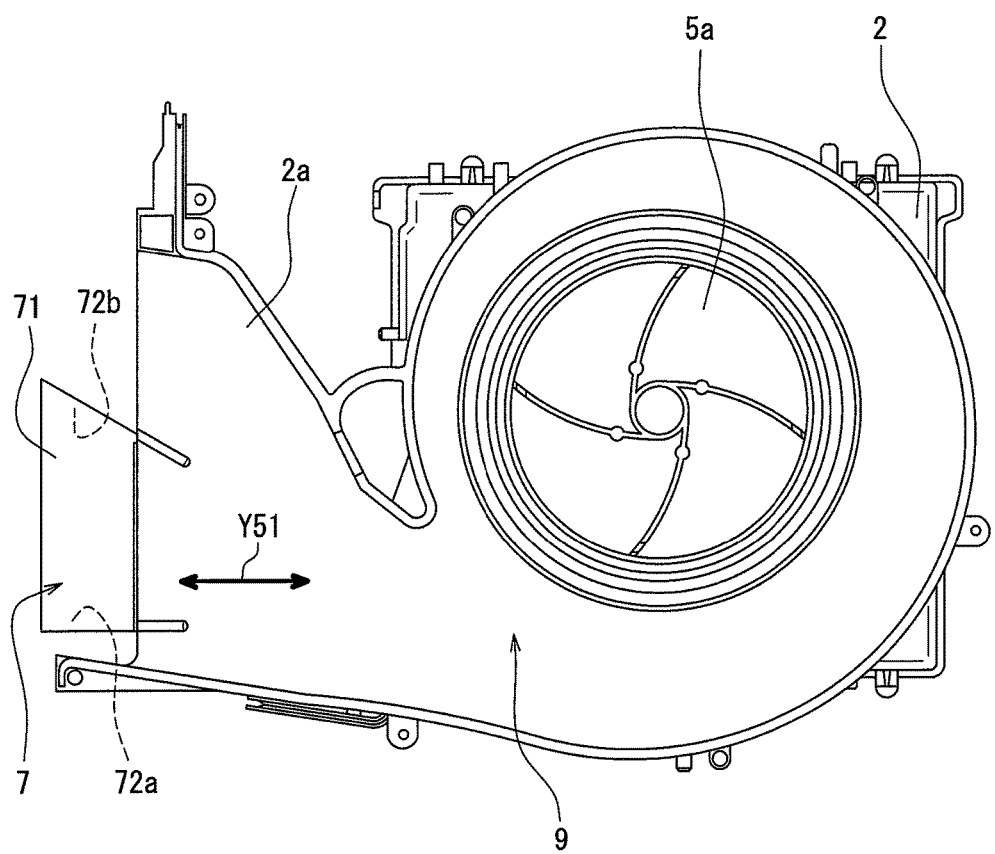
FIG. 5 is a view showing a bottom surface of a first blower case of the first embodiment when the deflection guide is viewed in a direction indicated by an arrow V of FIG. 4.

As has been described, the deflection guide 7 in the first embodiment is integrally molded with the first blower case 2a on the upper side (ceiling side). Hence, the support portion 72 of the deflection guide 7 supports the deflection portion 71 by extending from the first blower case 2a. The support portion 72 is integrally molded with the first blower case 2a situated on the upper side and forming the blower unit 2. The support portion 72 is a plate-like member that does not interfere with the flow of air and guides the flow of air to an appropriate direction. FIG. 5 shows the deflection guide 7 when viewed in a direction indicated by an arrow V of FIG. 4. The first blower case 2a has a space 5a defined by a scroll case, in which to store the blower 5 at the center.

Figure 6:
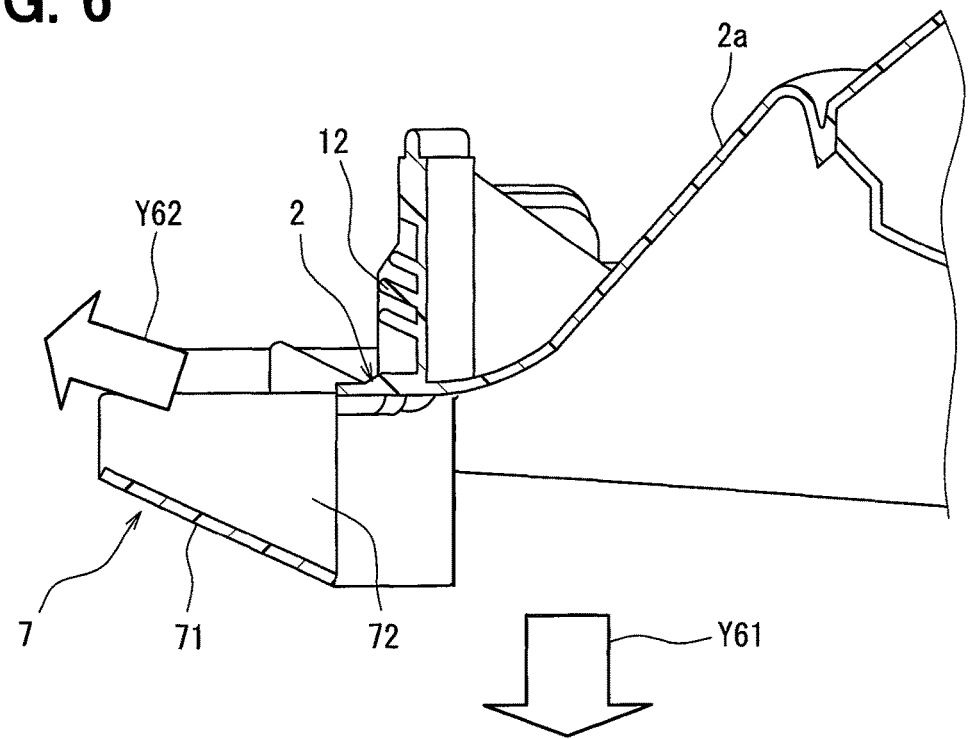
FIG. 6 is a partially enlarged view of an air conditioning device of FIG. 4 of the first embodiment.

FIG. 6 shows a state in which the deflection guide 7 can be integrally molded with the first blower case 2a. As is shown in FIG. 6, the deflection guide 7 is integrally molded with the first blower case 2a continuously from the same resin. The deflection guide 7 can be integrally molded with the first blower case 2a continuously from the same resin by, for example, disposing a fixed die on an upper side of FIG. 6 and allowing a movable die to run through the lower side of FIG. 6 as indicated by an arrow Y61 and a slide die in a direction indicated by an arrow Y62. In such a case, the molding is made easier by the defection guide 7 situated, as shown in FIG. 6, at the end of the blower case 2a, which is a single resin molded component.

Figure 7:
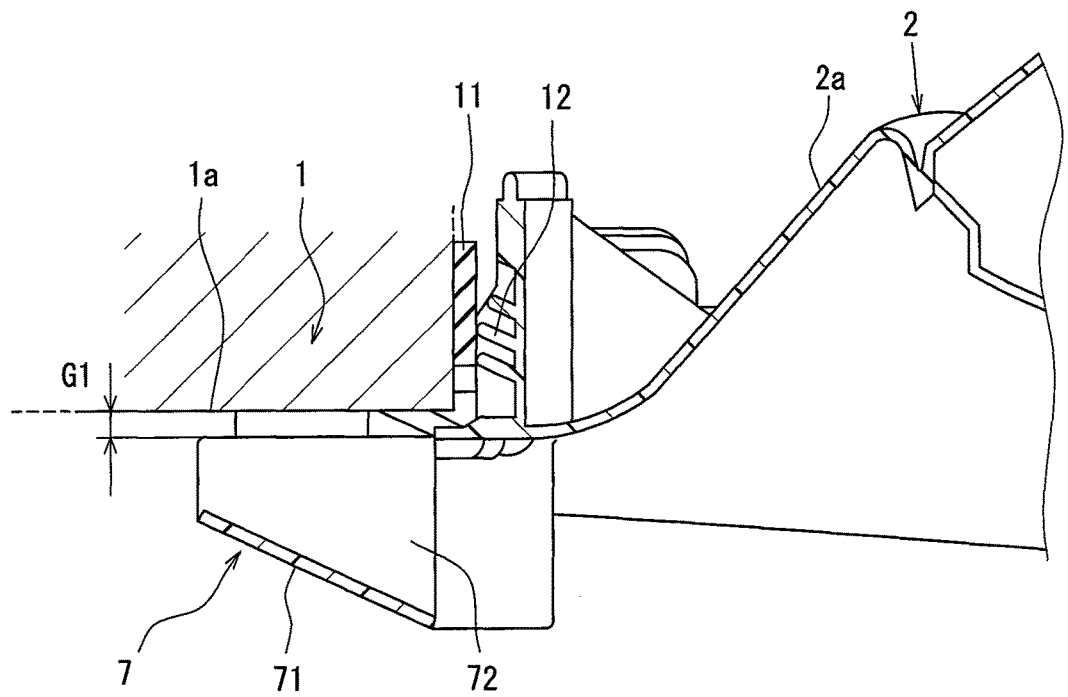
FIG. 7 is a view showing an assembly relation of the evaporator and the deflection guide of FIG. 6.

FIG. 7 shows a state when the evaporator 1 is fit to the first blower case 2a having the deflection guide 7. The evaporator 1 and the first blower case 2a are coupled to each other by pressing one end of the evaporator 1 against a packing retainer portion 12 of the first blower case 2a via rubber packing 11. The plate-like support portion 72 of the deflection guide 7 secures a gap G1 between the support portion 72 and the end of the evaporator 1 for air to flow. A size of the gap G1 is 3 mm. The size of the gap G1 may be at least 1.5 mm and an upper limit may be determined as needed. In practice, however, it is preferable that the gap G1 is in a range from 2 mm to 5 mm.

The gap G1 will be described more in detail. The support portion 72 splits the flow of air heading for the temperature regulation unit 3 from the blower 5 to a flow of air on one side and a flow of air on the other side in a direction perpendicular to the flow of air at the support portion 72. A part of air heading for the temperature regulation unit 3 from the blower 5 flows by striding over a front-surface side and a back-surface side of the support portion 72 via the gap G1. Consequently, contact between the evaporator 1 and the deflection guide 7 made due to vehicle vibrations or the like can be avoided. At the same time, because a part of air heading for the temperature regulation unit 3 flows by striding over the front-surface side and the back-surface side of the support portion 72, a difference of inflow air velocities between the front surface and the back surface of the support portion 72 of the deflection guide 7 is reduced.

Figure 8:
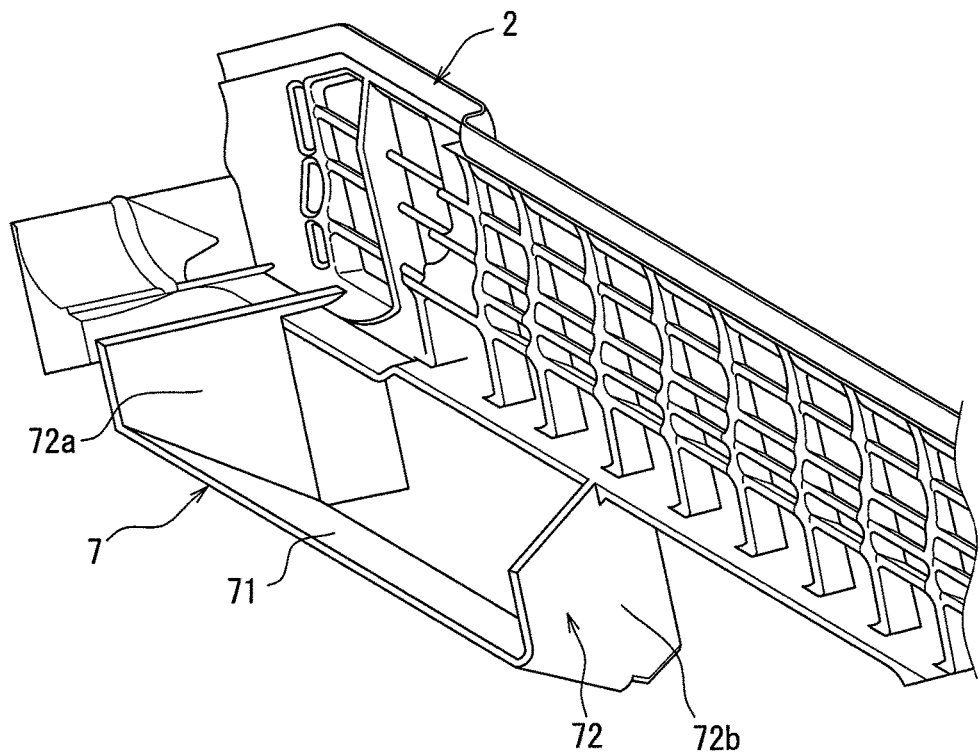
FIG. 8 is a perspective view of the deflection guide and a blower unit of the first embodiment.

FIG. 8 shows a shape of the deflection guide 7 of FIG. 6 when viewed diagonally upward left. The plate-like support portion 72 of the deflection guide 7 has a first support portion 72a substantially parallel to a direction (vehicle width direction) connecting the blower unit 2 and the temperature regulation unit 3 indicated by an arrow Y51 of FIG. 5 and a second support portion 72b inclined with respect to the direction indicated by the arrow Y51.

Figure 9:
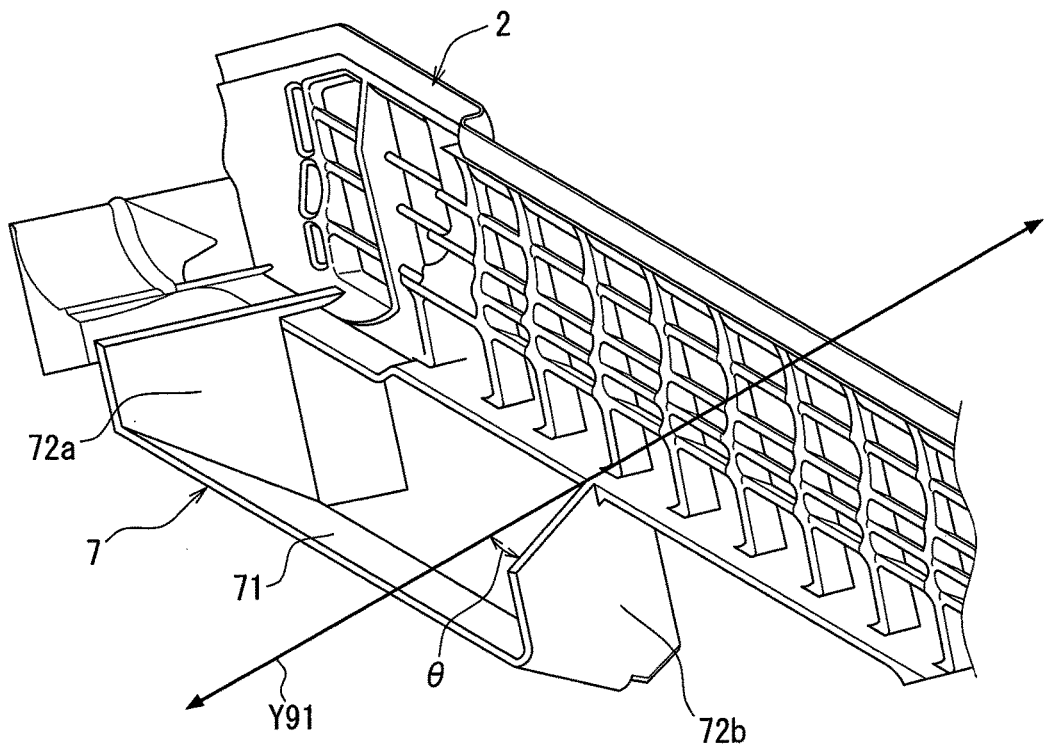
FIG. 9 is a perspective view schematically showing the deflection guide and the blower unit of the first embodiment.

FIG. 9 shows a state in which the second support portion 72b, which is a part of the plate-like support portion 72 corresponding to a side wall of the deflection guide 7, is inclined at a predetermined angle with respect to the vehicle width direction indicated by an arrow Y91. By inclining the second support portion 72b, which is a part of the support portion 72, with respect to a direction (vehicle width direction) from the blower unit 2 to the temperature regulation unit 3 as above, spreading of the flow of air from the support portion 72 is controlled.

The second support portion 72b is therefore useful in making a distribution of air flowing into the evaporator 1 homogeneous and contributes to correcting an uneven temperature distribution of air-conditioning air, which is air that has passed through the evaporator 1 and to be blown into the vehicle interior. In other words, when air having a main vector in a direction along the arrow Y91 of FIG. 9 flows to the deflection guide 7, a path of air expands due to the collision of air with the deflection portion 71 of the deflection guide 7 and also the inclination of the support portion 72b. A flow velocity is reduced as the path of air expands and the flow of air forced to change the direction by the collision becomes homogeneous and heads for the inflow plane 1*a* of the evaporator 1.

In the case of FIG. 9, a plate-like portion of the support portion 72*b* is provided so as to incline at an inclination angle, θ=30 degrees, with respect to the direction (vehicle width direction) indicated by the arrow Y91 from the blower unit 2 to the temperature regulation unit 3. Hence, expansion of air from the inflow plane 1*a* is controlled.

As has been described, the deflection guide 7 is to make an air velocity distribution across the front surface of the evaporator 1 homogeneous and forcedly deflects the flow of air from the blower 5 to introduce air to the blower unit side of the main surface of the evaporator 1 where an inflow air velocity of the evaporator 1 is low.

The gap G1 (FIG. 7) is present between the deflection guide 7 and the evaporator 1 and the flow of air is also spread to a region immediately downstream of the deflection guide 7 via the gap G1. A pressure can be also made homogeneous by providing the gap G1. Hence, air can be introduced to the deflection guide 7 smoothly and an increase in pressure loss caused by deflecting the flow of air is restricted. A flow of air on the periphery of the deflection guide 7 is made homogeneous also by an air guiding wall-like portion 2*b*1 (FIG. 4) in a bottom surface of the second blower case 2*b* and introduced to the front surface of the evaporator 1.

Figure 10:
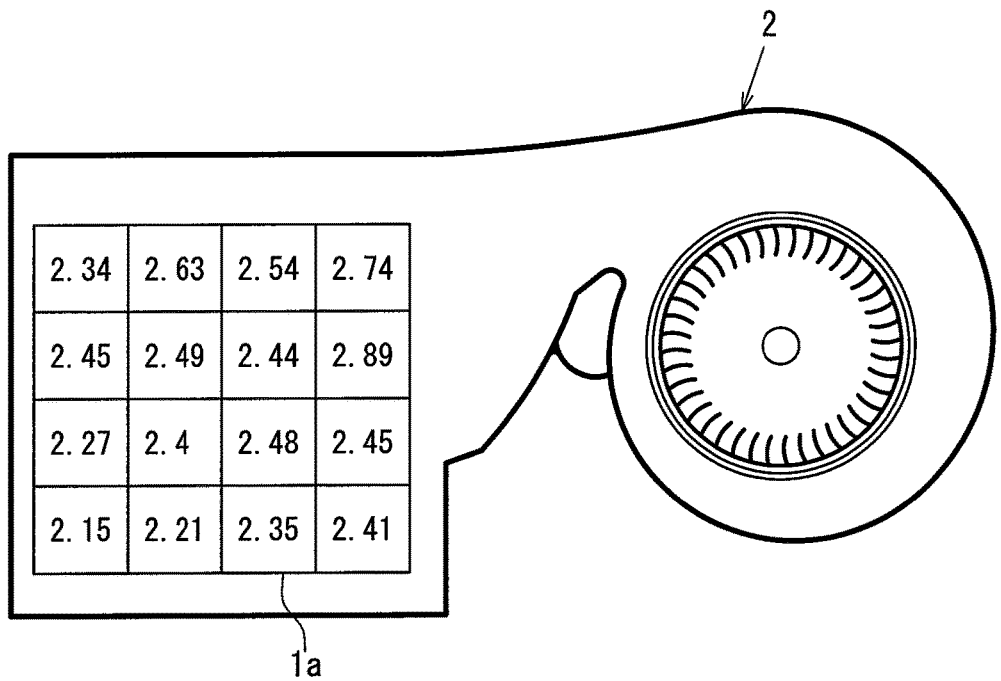
FIG. 10 is a schematic view showing an air velocity distribution of air flowing into the evaporator in the first embodiment.

An air velocity distribution of air flowing into the evaporator 1, which is improved by the deflection guide 7 of the first embodiment, will be described using FIG. 10. When the inflow plane 1*a* via which air flows into the evaporator 1 is divided to 16 segments, a ratio of a minimum value and a maximum value of a mean air velocity is 0.74 and a pressure loss is 330 Pa. It is understood from FIG. 10 that a distribution of an inflow air velocity of the evaporator 1 is homogenized and the air velocity distribution is improved. The deflection guide 7 is omitted in FIG. 10.

Figure 11:
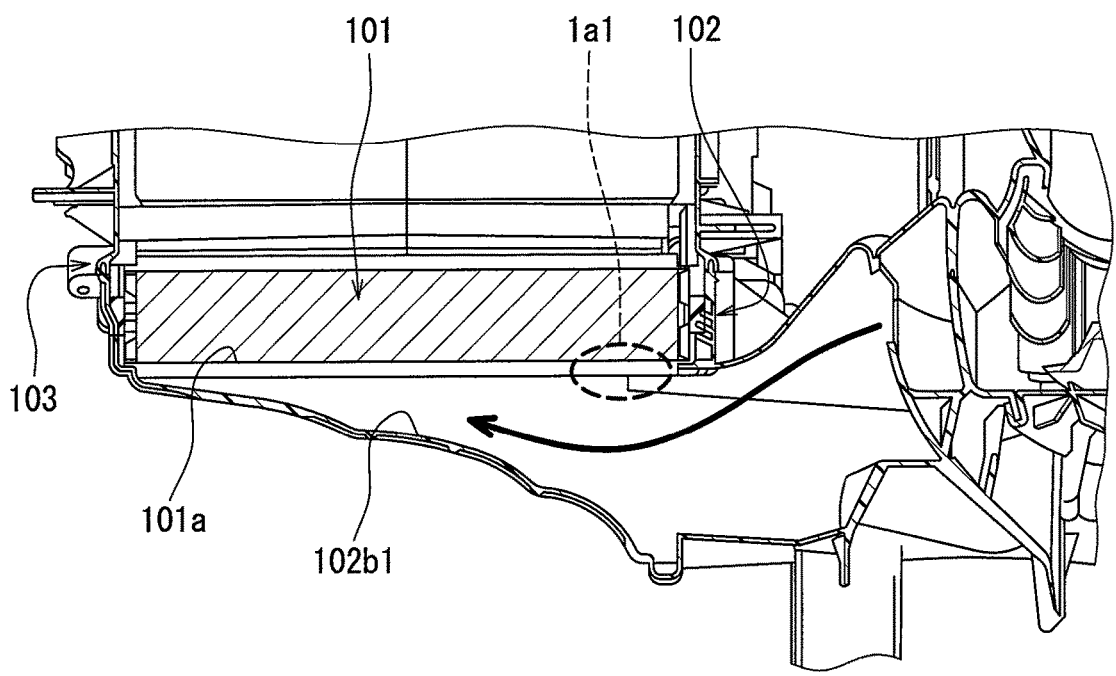
FIG. 11 is a partial sectional view corresponding to FIG. 4 in a first comparative example of the present disclosure.

First through third comparative examples of the present disclosure will now be described using FIG. 11 through FIG. 15. In a first comparative example, the air guiding wall-like portion 2*b*1 of the second blower case 2*b* alone is devised without providing the deflection guide 7, which will be described using FIG. 11. FIG. 11 corresponds to FIG. 4 and shows shapes of air-conditioning units 102 and 103 of the first comparative example. A second blower case 102*b* is provided with an air guiding wall-like portion 102*b*1 in which a space volume decreases more from a blower unit 102 to a temperature regulation unit 103 (from the right to left of FIG. 11).

Figure 12:
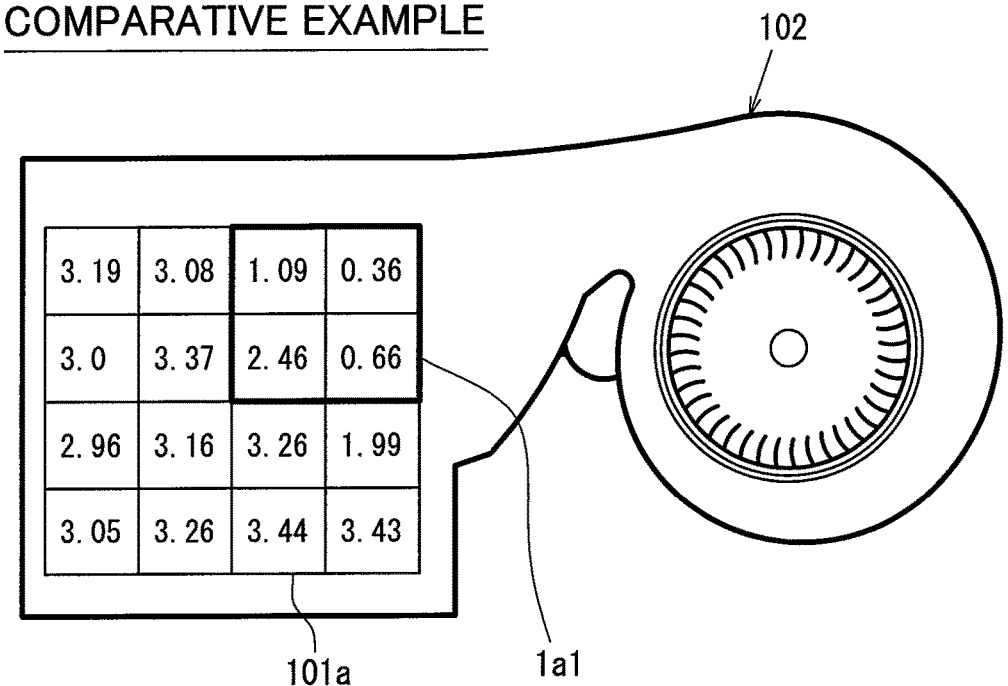
FIG. 12 is a schematic view showing an air velocity distribution of air flowing into an evaporator in the first comparative example.

FIG. 12 shows an air velocity distribution of air flowing into an inflow plane 101*a* of an evaporator 101 of the first comparative example. In FIG. 11, air is less likely to flow to an end 1*a*1 (encircled by a broken line) of the inflow plane 101*a* of the evaporator 101 nearer to the blower unit 102, which causes unevenness in velocity of air flowing into the evaporator 101.

Accordingly, an air velocity distribution deteriorates in a portion 1*a*1 enclosed by a thick line of FIG. 12. As is shown in FIG. 12, when the inflow plane 101*a* via which air flows into the evaporator 101 is divided to 16 segments, a ratio of a minimum value and a maximum value of a mean air velocity is 0.11 and a pressure loss is 450 Pa.

Figure 13:
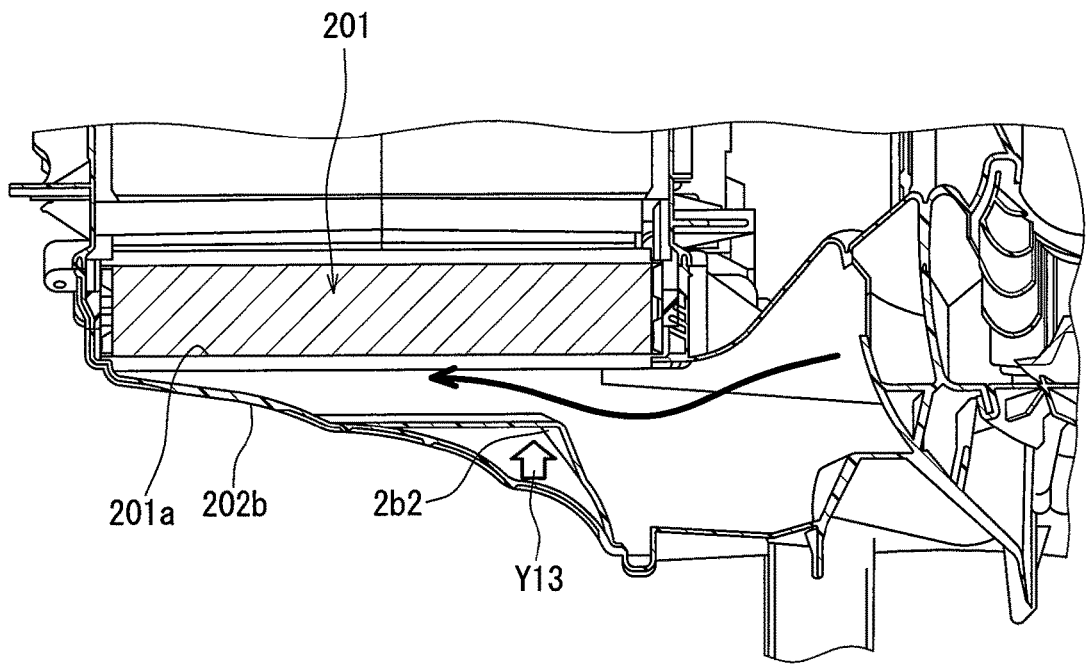
FIG. 13 is a partial sectional view corresponding to FIG. 4 in a second comparative example of the present disclosure.

A second comparative example is a case where the deflection guide 7 is not provided, which will be described using FIG. 13. In FIG. 13, the deflection guide 7 is not provided and an offset shape portion (convex portion) 2*b*2 is provided instead by lifting a part of a bottom surface of a second blower case 202*b* as indicated by an arrow Y13.

When an attempt is made to homogenize an air velocity distribution by providing the offset shape portion (convex portion) 2*b*2, it is discovered that an air volume is reduced because a ventilation area is reduced markedly and hence ventilation resistance increases.

Figure 14:
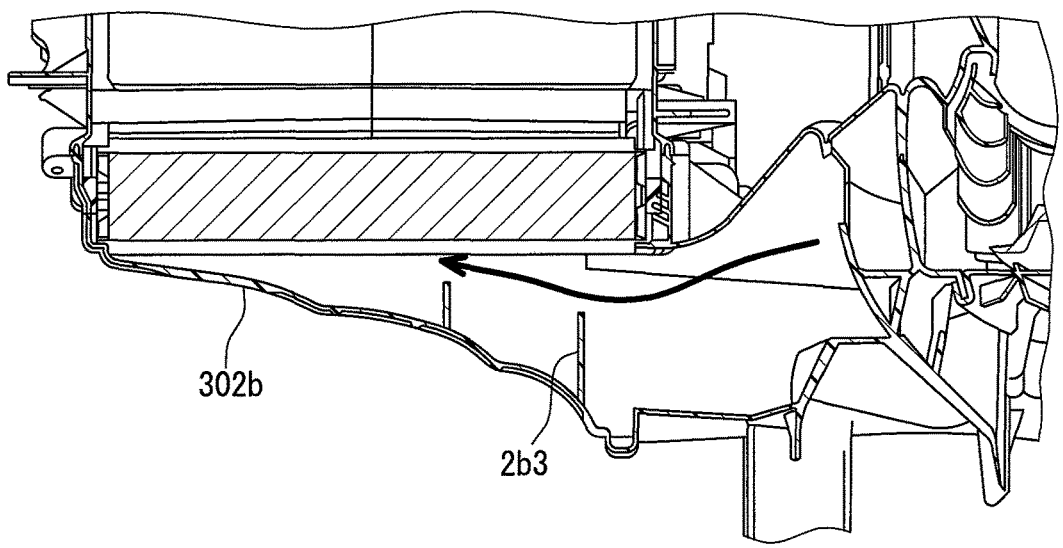
FIG. 14 is a partial sectional view corresponding to FIG. 4 in a third comparative example of the present disclosure.

A third comparative example is a case where the deflection guide 7 is not provided, which will be described using FIG. 14. In FIG. 14, the deflection guide 7 is not provided and multiple screen-like ribs 2*b*3 are provided to a bottom surface of a second blower case 302*b* instead. When an attempt is made to homogenize an air velocity distribution by providing the screen-like ribs 2*b*3, it is discovered that an air volume is reduced because a ventilation area is reduced markedly and hence ventilation resistance increases.

Figure 15:
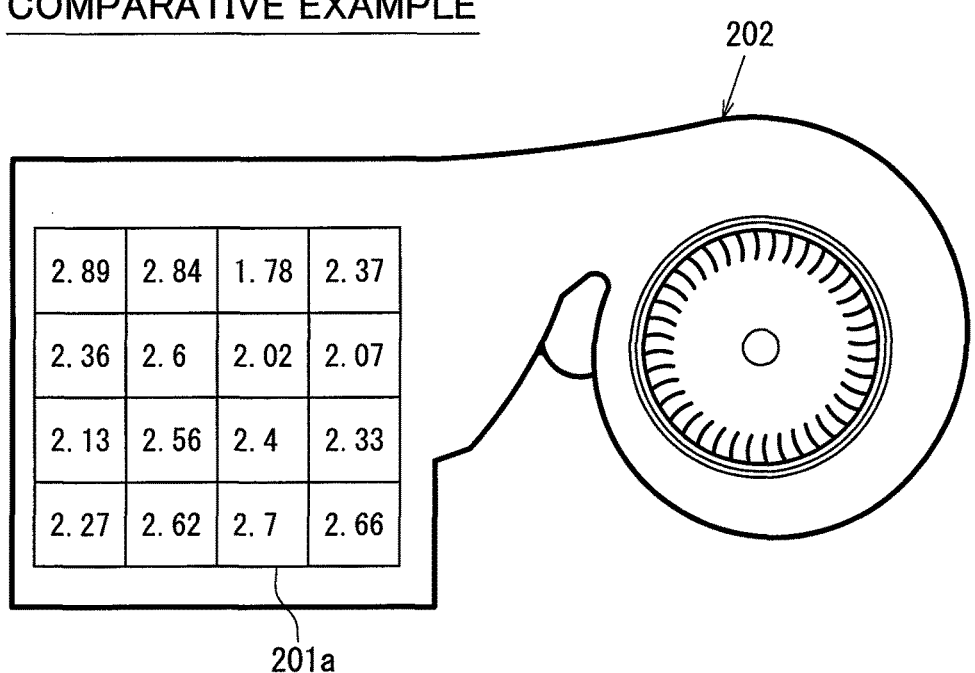
FIG. 15 is a schematic view showing an air velocity distribution of air flowing into an evaporator in the second comparative example.

FIG. 15 shows an air velocity distribution of air flowing into an evaporator 201 in the second comparative example of FIG. 13. When an inflow plane 201*a* of FIG. 15 via which air flows into the evaporator 201 is divided to 16 segments, a ratio of a minimum value and a maximum value of a mean air velocity is 0.62 and a pressure loss is 400 Pa. A result similar to the result of the second comparative example is obtained also in the third comparative example of FIG. 14.

A function and an effect of the first embodiment will now be described. In the first embodiment, the blower unit 2 is formed by combining the first blower case 2*a* and the second blower case 2*b*, and the deflection guide 7 is integrally molded with at least one of the first blower case 2*a* and the second blower case 2*b* at one end.

When configured as above, the deflection guide 7 can be molded at the same time when one blower case is molded and the manufacturing becomes easier. Also, a need to provide a separate part in addition to the blower cases 2*a* and 2*b* is eliminated. Hence, an increase of the cost can be restricted. In addition, because the deflection guide 7 is molded integrally with the blower case 2*a* or 2*b* at one end, the movable die can be released easily.

The support portion 72 is provided so as to incline with respect to the vehicle width direction (width direction of the vehicle) from the blower 5 to the temperature regulation unit 3. Hence, the flow of air that has collided with the deflection portion 71 heads for the end part of the inflow plane 1*a* adjacent to the blower 5 while expanding along the support portion 72.

The configuration as above is useful in homogenization of a distribution of air flowing into the evaporator 1 and contributes to correcting an uneven temperature distribution of air-conditioning air, which is air that has passed through the evaporator 1 and to be blown into the vehicle interior. In other words, a path of air expands due to the collision of air with the deflection portion 71 of the deflection guide 7 and also the inclination of the support portion 72*b*. A flow velocity is reduced as the path of air expands. Hence, the flow of air forced to change the direction by the collision is spread evenly across the inflow plane 1*a* of the evaporator 1.

The support portion 72 splits the flow of air heading for the temperature regulation unit 3 from the blower unit 2 to a flow of air on the front-surface (first surface) side of the support portion 72 and a flow of air on the back-surface (second surface) side. The gap G1 is provided between the end of the support portion 72 on the evaporator side and the evaporator 1. A part of air heading for the temperature regulation unit 3 from the blower unit 2 flows by striding over the front-surface side and the back-surface side via the gap G1. In other words, a flow of air on the front-surface side of the support portion 72 and a flow of air on the back-surface side of the support portion 72 merge via the gap G1.

Consequently, by providing the gap G1, contact between the evaporator 1 and the deflection guide 7 made due to vehicle vibrations or the like can be avoided. At the same time, a part of air heading for the temperature regulation unit 3 flows by striding over the front-surface side and the back-surface side of the support portion 72 and a difference of inflow air velocities between the front surface and the back surface of the support portion 72 of the deflection guide 7 is reduced. Hence, a contribution can be made to homogenize an air distribution.

The support portion 72 as an integral part of the deflection portion 71 is provided so as to cover the end part of the inflow plane 1a of the evaporator 1 adjacent to the blower 5 via the gap G1.

When configured as above, because the support portion 72 is provided so as to cover the blower-side end part of the inflow plane 1a via the gap G1, the flow of air that has collided with the deflection portion 71 moves toward the blower-side end part of the inflow plane 1a. Eventually, a part of air passes through the gap G1 and spreads. Hence, a distribution of air in the vicinity of the blower-side end part of the inflow plane 1a can be satisfactory.

Second Embodiment

A second embodiment of the present disclosure will now be described. In respective embodiments below, a description of components same as the counterparts of the first embodiment above is omitted by labeling such components with same reference numerals and different configuration and characteristics will be described. In the second and subsequent embodiments, reference numerals same as those used in the first embodiment above denote the same configuration and a reference should be made to the description above.

Figure 16:
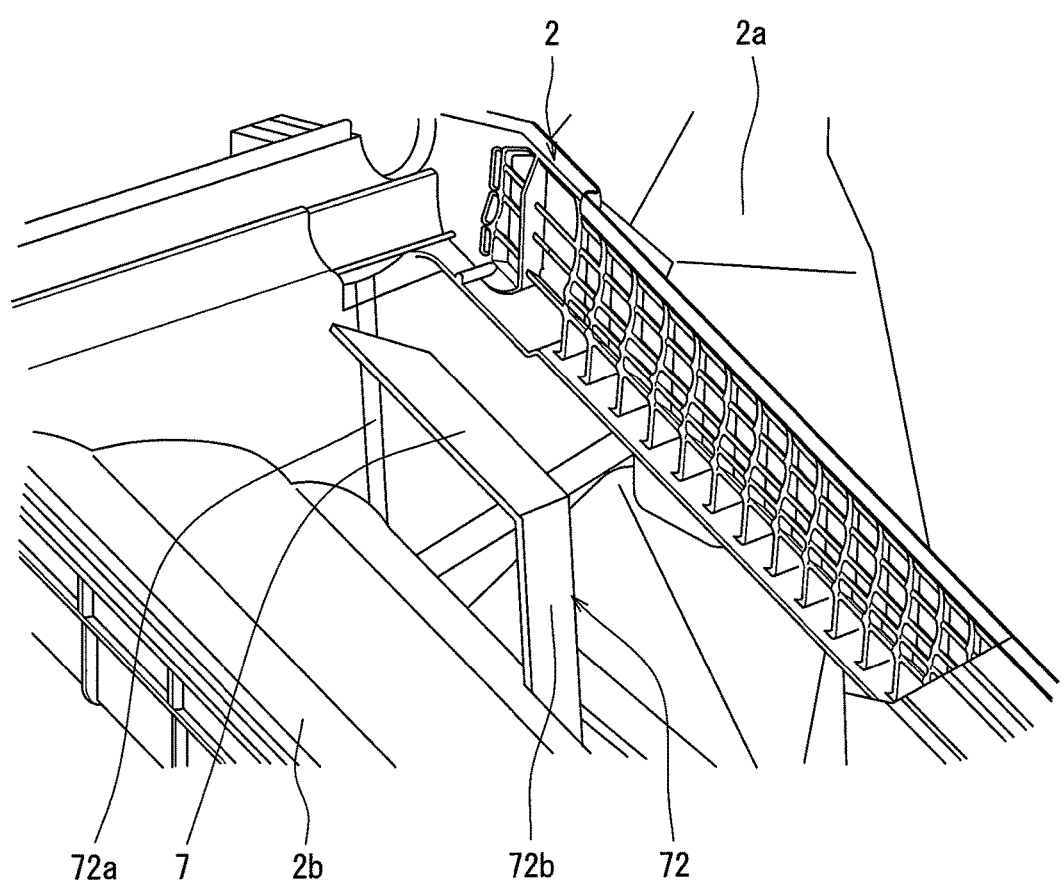
FIG. 16 is a perspective view of a deflection guide according to a second embodiment of the present disclosure.

FIG. 16 is a perspective view of a deflection guide according to the second embodiment of the present disclosure. Referring to FIG. 16, a deflection guide 7 is integrally molded with a second blower case 2b disposed on a lower side (vehicle floor side) from resin continuing to resin forming the second blower case 2b. A plate-like support portion 72 of the deflection guide 7 includes a first support portion 72a and a second support portion 72b.

Third Embodiment

Figure 17:
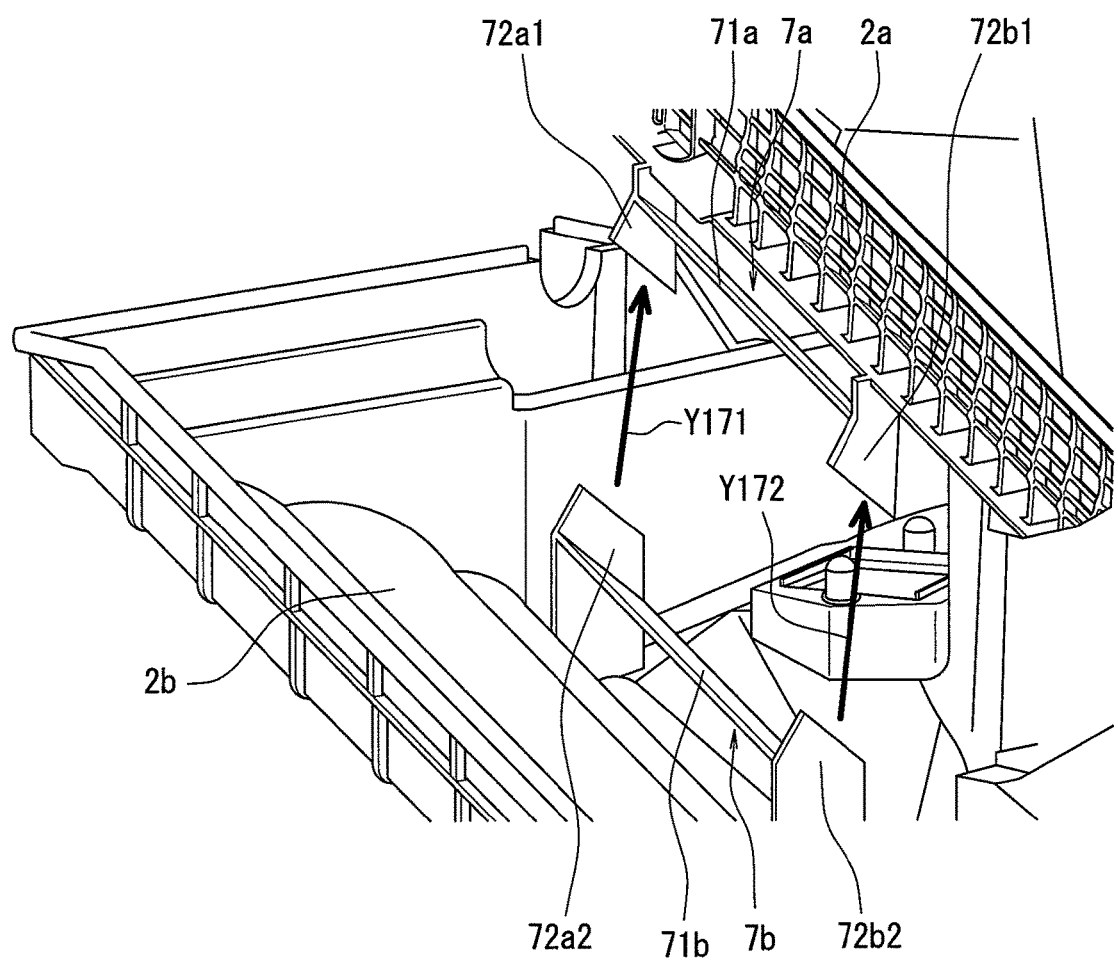
FIG. 17 is a perspective view of a deflection guide according to a third embodiment of the present disclosure before the deflection guide is fit.
Figure 18:
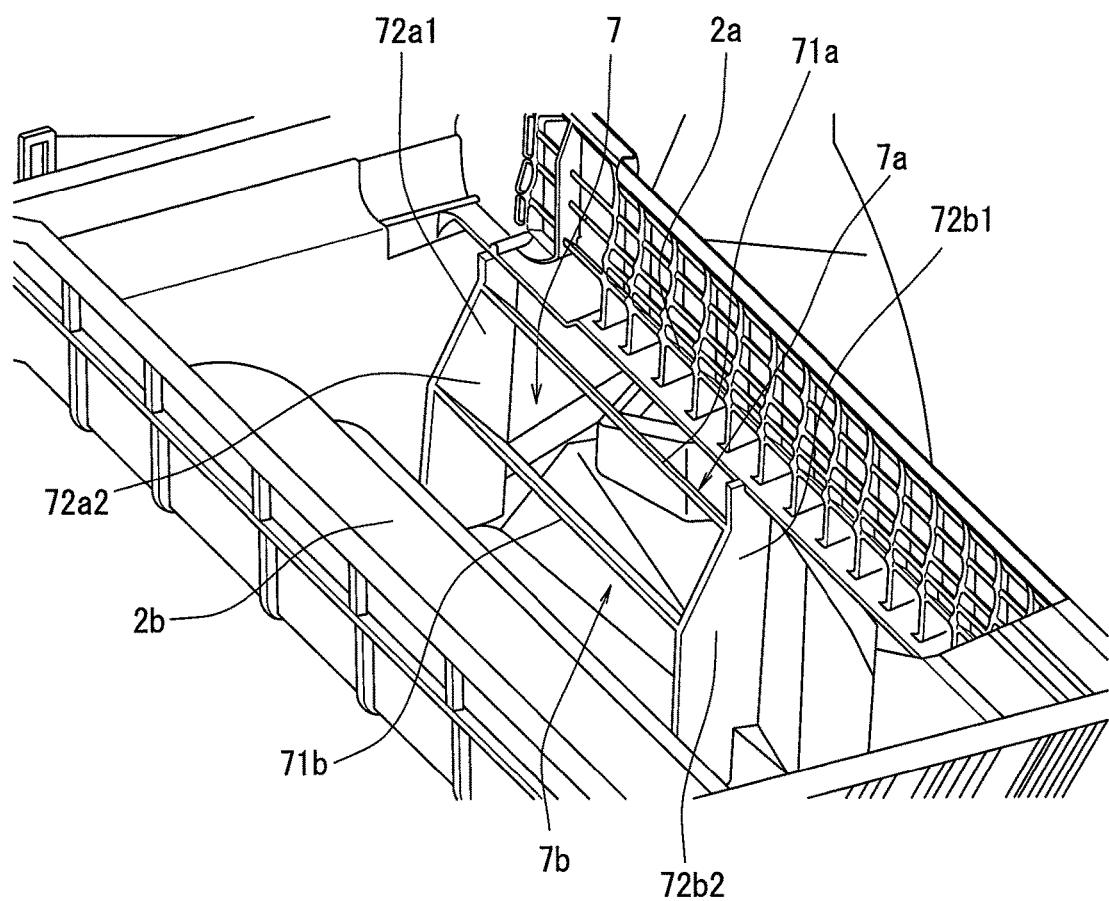
FIG. 18 is a perspective view of the deflection guide according to the third embodiment of the present disclosure after the deflection guide is fit.

A third embodiment of the present disclosure will now be described. A portion different from the embodiments above will be described. FIG. 17 shows a state before a deflection guide 7 of the third embodiment of the present disclosure is fit. FIG. 18 shows a state after the deflection guide 7 is fit. Referring to FIG. 17, a support portion 72a2 is fit to a support portion 72a1 of the deflection guide 7 as indicated by an arrow Y171. Also, a support portion 72b2 is fit to a support portion 72b1 as indicated by an arrow Y172.

Herein, a blower case 2 is formed by combining a first blower case 2a and a second blower case 2b, which are provided separately. A deflection guide 7 includes a first deflection guide portion 7a as an integral part of the first blower case 2a and a second deflection guide portion 7b as an integral part of the second blower case 2b.

The deflection guide 7 shaped like an air channel in which to flow air is formed as FIG. 18 by combining the first deflection guide portion 7a and the second deflection guide portion 7b. A deflection portion 71 of the deflection guide 7 includes a pair of plate-like first and second deflection portions 71a and 71b that face each other and bridge between two pairs of mutually facing support portions 72a1 and 72b1 and mutually facing support portions 72a2 and 72b2. Owing to the configuration as above, the deflection guide 7 shaped like an air channel of an arbitrary size can be provided to an arbitrary position. Hence, an air velocity can be readily adjusted in a local spot upstream of the evaporator 1.

In the third embodiment, the blower unit 2 is formed by combining the first blower case 2a and the second blower case 2b. The deflection guide 7 includes the first deflection guide portion 7a as an integral part of the first blower case 2a and the second deflection guide portion 7b as an integral part of the second blower case 2b.

The deflection guide 7 shaped like an air channel in which to flow air is formed by combining the first deflection guide portion 7a and the second deflection guide portion 7b. The deflection guide 7 includes a pair of the first deflection portion 71a and the second deflection portion 71b that face each other and bridge between the support portions 72a1 and 72b1 and between the support portions 72a2 and 72b2, respectively.

Owing to the configuration as above, the deflection guide 7 shaped like an air channel of an arbitrary size can be provided to an arbitrary position. Hence, an air velocity can be readily adjusted in a local spot upstream of the evaporator 1.

Fourth Embodiment

Figure 19:
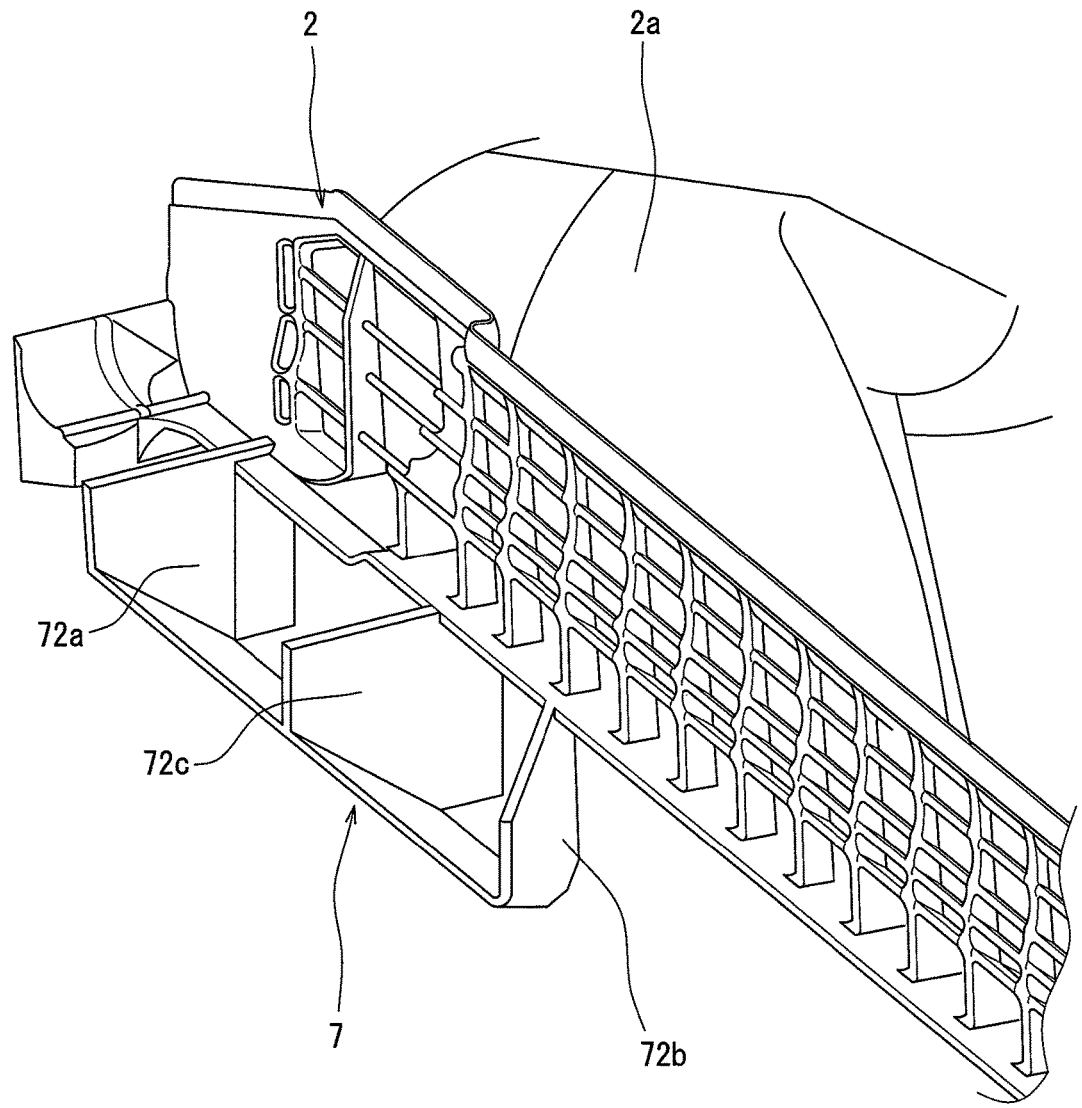
FIG. 19 is a perspective view of a deflection guide according to a fourth embodiment of the present disclosure.

A fourth embodiment will now be described. A portion different from the embodiments above will be described. FIG. 19 shows a deflection guide 7 according to the fourth embodiment of the present disclosure. As is shown in FIG. 19, the deflection guide 7 is provided with three support portions 72a, 72b, and 72c to split a path of air passing through the deflection guide 7 to two or more.

While the embodiments above have described the preferred embodiments of the present disclosure, it should be appreciated that the present disclosure is not limited to the embodiments above and can be implemented in various modifications within the scope and sprit of the present disclosure. The structures of the embodiments above are only illustrative and the scope of the present disclosure is not limited to the scope of the description of the structures.

Figure 20:
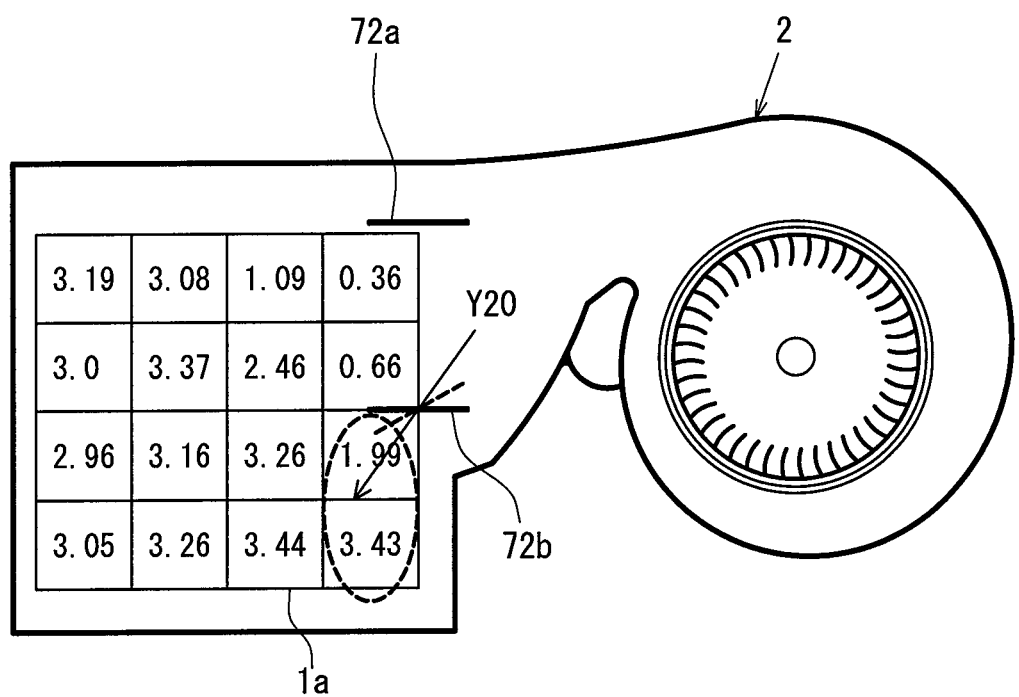
FIG. 20 is a view showing a relation of an air velocity distribution of air flowing into an evaporator and a deflection guide in another embodiment of the present disclosure.

FIG. 20 shows an air velocity distribution of air flowing into an inflow plane 1a of an evaporator 1 according to another embodiment of the present disclosure. In the respective embodiments above, air hardly collides with the support portion 72b as in a region encircled by a broken line in FIG. 20 unless the support portion 72b is inclined. To overcome such an inconvenience, the support portion 72b is inclined as indicated by a broken line. However, it may be configured in such a manner that pores are provided to the support portion 72b disposed parallel to the support portion 72a without being inclined as shown in FIG. 20 for letting air pass through the pores as indicated by an arrow Y20. Consequently, air can be effectively let into a portion (two segments on the lower right) where an air velocity is low in the air velocity distribution shown in FIG. 20.

What is claimed is:
1. An air conditioning device for a vehicle, comprising:
a blower unit having a blower that blows air;
a temperature regulation unit disposed on a side of the blower unit, the temperature regulation unit having an evaporator provided with an inflow plane extending in a flow direction of the air blown from the blower and configured to exchange heat with air inflowing through the inflow plane; and a deflection guide disposed upstream of the evaporator in a direction of a flow of air flowing into the inflow plane of the evaporator, the deflection guide deflecting a flow of the air from the blower to the inflow plane of the evaporator, wherein:

the deflection guide includes, a deflection portion having a plate shape and inclined with respect to the inflow plane of the evaporator, and a support portion supporting the deflection portion, wherein the deflection portion and the support portion are formed from a single bent plate; and the deflection portion changes a direction of a flow of the air blown from the blower into a first direction toward an end part of the inflow plane adjacent to the blower while the support portion changes the direction of the flow of the air blown from the blower into a second direction different from the first direction.

2. The air conditioning device for a vehicle, according to claim 1, wherein:

the blower unit has a first blower case and a second blower case which are combined to each other to store the blower;

the deflection guide is integrally molded with an end part of at least one of the first blower case and the second blower case; and the support portion extends from the end part of the at least one of the first blower case and the second blower case and supports the deflection portion.

3. The air conditioning device for a vehicle, according to claim 1, wherein:

the blower unit and the temperature regulation unit are disposed in a vehicle width direction;

the support portion is inclined with respect to the vehicle width direction; and air that has collided with the deflection portion heads for the end part of the inflow plane adjacent to the blower while expanding along the support portion.

4. The air conditioning device for a vehicle, according to claim 1, wherein:

the support portion splits a flow of air heading for the temperature regulation unit from the blower unit into a flow of air on a first surface side of the support portion and a flow of air on a second surface side of the support portion;

a gap is provided between an end of the support portion adjacent to the evaporator and the evaporator; and the flow of air on the first surface side of the support portion and the flow of air on the second surface side of the support portion merge through the gap.

5. The air conditioning device for a vehicle, according to claim 4, wherein the support portion covers the end part of the inflow plane of the evaporator adjacent to the blower via the gap.

6. The air conditioning device for a vehicle, according to claim 1, wherein:

the blower unit includes a first blower case and a second blower case which are combined to each other to store the blower;

the deflection guide includes a first deflection guide portion as an integral part of the first blower case, and a second deflection guide portion as an integral part of the second blower case;

the deflection guide is shaped like an air channel in which to flow air; and the deflection portion includes a first deflection portion and a second deflection portion that face each other and bridge across the support portion.

7. The air conditioning device for a vehicle, according to claim 1, wherein the deflection portion faces to the end part of the inflow plane adjacent to the blower in a direction perpendicular to the inflow plane.

8. The air conditioning device for a vehicle, according to claim 1, wherein:

one end of the deflection portion in a vehicle width direction is situated between another end of the deflection portion in the vehicle width direction and the inflow plane in a direction perpendicular to the inflow plane; and the another end of the deflection portion in the vehicle width direction is situated between the one end of the deflection portion in the vehicle width direction and the blower unit in the vehicle width direction.

9. The air conditioning device according to claim 1, wherein:

the temperature regulation unit is disposed on the side of the blower unit in a vehicle width direction;

the inflow plane of the evaporator faces in a downward direction of the vehicle;

the blower unit includes a blower passage located downstream of the blower in the flow direction of the air blown from the blower;

the blower passage extends in the vehicle width direction and expands in a rearward direction of the vehicle; and a downstream end of the blower passage in the flow direction of the air blown from the blower is positioned downward of the inflow plane.

10. An air conditioning device for a vehicle, comprising:

a blower unit having a blower that blows air;

a temperature regulation unit disposed on a side of the blower unit in an arrangement direction, the temperature regulation unit having an evaporator provided with an inflow plane extending in a flow direction of the air blown from the blower and configured to exchange heat with air inflowing through the inflow plane; and a deflection guide disposed upstream of the evaporator in a direction of a flow of air flowing into the inflow plane of the evaporator, the deflection guide deflecting a flow of the air from the blower to the inflow plane of the evaporator, wherein:

the deflection guide includes, a deflection portion having a plate shape and inclined with respect to the inflow plane of the evaporator, and a support portion formed as a plate supporting the deflection portion and having an inclined surface with respect to a direction which is parallel to the inflow plane and perpendicular to the arrangement direction; and the deflection portion changes a direction of a flow of the air blown from the blower into a first direction toward an end part of the inflow plane adjacent to the blower while the support portion changes the direction of the flow of the air blown from the blower into a second direction different from the first direction.

11. The air conditioning device for a vehicle, according to claim 10, wherein:

the support portion splits a flow of air heading for the temperature regulation unit from the blower unit into a flow of air on a first surface side of the support portion and a flow of air on a second surface side of the support portion;
a gap is provided between an end of the support portion adjacent to the evaporator and the evaporator; and
the flow of air on the first surface side of the support portion and the flow of air on the second surface side of the support portion merge through the gap.

12. The air conditioning device for a vehicle, according to claim 11, wherein the support portion covers the end part of the inflow plane of the evaporator adjacent to the blower via the gap.

13. The air conditioning device for a vehicle, according to claim 10, wherein:
the blower unit includes a first blower case and a second blower case which are combined to each other to store the blower;
the deflection guide includes a first deflection guide portion as an integral part of the first blower case, and a second deflection guide portion as an integral part of the second blower case;
the deflection guide is shaped like an air channel in which to flow air; and
the deflection portion includes a first deflection portion and a second deflection portion that face each other and bridge across the support portion.

14. The air conditioning device according to claim 10, wherein:
the arrangement direction is a vehicle width direction;
the inflow plane of the evaporator faces in a downward direction of the vehicle;
the blower unit includes a blower passage located downstream of the blower in the flow direction of the air blown from the blower;
the blower passage extends in the vehicle width direction and expands in a rearward direction of the vehicle; and
a downstream end of the blower passage in the flow direction of the air blown from the blower is positioned downward of the inflow plane.

15. An air conditioning device for a vehicle, comprising:
a blower unit having a blower that blows air;
a temperature regulation unit disposed on a side of the blower unit, the temperature regulation unit having an evaporator provided with an inflow plane extending in a flow direction of the air blown from the blower and configured to exchange heat with air inflowing through the inflow plane; and
a deflection guide disposed upstream of the evaporator in a direction of a flow of air flowing into the inflow plane of the evaporator, the deflection guide deflecting a flow of the air from the blower to the inflow plane of the evaporator, wherein:
the deflection guide includes,
a deflection portion having a plate shape and inclined with respect to the inflow plane of the evaporator, and
a support portion supporting the deflection portion;
the deflection portion changes a direction of a flow of the air blown from the blower toward an end part of the inflow plane adjacent to the blower;
the support portion splits a flow of air heading for the temperature regulation unit from the blower unit into a flow of air on a first surface side of the support portion and a flow of air on a second surface side of the support portion;
a gap is provided between an end of the support portion adjacent to the evaporator and the evaporator; and
the flow of air on the first surface side of the support portion and the flow of air on the second surface side of the support portion merge through the gap; and
the support portion covers the end part of the inflow plane of the evaporator adjacent to the blower via the gap.

16. The air conditioning device according to claim 15, wherein:
the temperature regulation unit is disposed on the side of the blower unit in a vehicle width direction;
the inflow plane of the evaporator faces in a downward direction of the vehicle;
the blower unit includes a blower passage located downstream of the blower in the flow direction of the air blown from the blower;
the blower passage extends in the vehicle width direction and expands in a rearward direction of the vehicle; and
a downstream end of the blower passage in the flow direction of the air blown from the blower is positioned downward of the inflow plane.

17. An air conditioning device for a vehicle, comprising:
a blower unit having a blower that blows air;
a temperature regulation unit disposed on a side of the blower unit, the temperature regulation unit having an evaporator provided with an inflow plane extending in a flow direction of the air blown from the blower and configured to exchange heat with air inflowing through the inflow plane; and
a deflection guide disposed upstream of the evaporator in a direction of a flow of air flowing into the inflow plane of the evaporator, the deflection guide deflecting a flow of the air from the blower to the inflow plane of the evaporator, wherein:
the deflection guide includes,
a deflection portion having a plate shape and inclined with respect to the inflow plane of the evaporator, and
a support portion supporting the deflection portion;
the deflection portion changes a direction of a flow of the air blown from the blower toward an end part of the inflow plane adjacent to the blower;
the blower unit includes a first blower case and a second blower case which are combined to each other to store the blower;
the deflection guide includes a first deflection guide portion as an integral part of the first blower case, and a second deflection guide portion as an integral part of the second blower case;
the deflection guide is shaped like an air channel in which to flow air; and
the deflection portion includes a first deflection portion and a second deflection portion that face each other and bridge across the support portion.

18. The air conditioning device according to claim 17, wherein:
the temperature regulation unit is disposed on the side of the blower unit in a vehicle width direction;
the inflow plane of the evaporator faces in a downward direction of the vehicle;
the blower unit includes a blower passage located downstream of the blower in the flow direction of the air blown from the blower;
the blower passage extends in the vehicle width direction and expands in a rearward direction of the vehicle; and
a downstream end of the blower passage in the flow direction of the air blown from the blower is positioned downward of the inflow plane.

* * * * *